July 4, 1950

W. H. THOMPSON 2,513,901

DOUBLE EFFECT SALT WATER STILL

Filed Nov. 5, 1946

6 Sheets-Sheet 1

Inventor
WILLIAM H. THOMPSON

By

George F. Gill
Attorney

July 4, 1950

W. H. THOMPSON 2,513,901

DOUBLE EFFECT SALT WATER STILL

Filed Nov. 5, 1946

6 Sheets-Sheet 6

Inventor
WILLIAM H. THOMPSON

By George T. Gill
Attorney

Patented July 4, 1950

2,513,901

UNITED STATES PATENT OFFICE 2,513,901

DOUBLE EFFECT SALT-WATER STILL

William H. Thompson, Chatham, N. J., assignor to Davis Engineering Corporation, Elizabeth, N. J., a corporation of Delaware Application November 5, 1946, Serial No. 707,774

5 Claims. (Cl. 202—174)

The invention herein disclosed relates to a distillation system that is particularly suitable for supplying distilled water for human consumption. More particularly, the invention relates to a distillation system that is especially suitable for distilling sea water to provide fresh water aboard ship.

An object of the invention is to provide a distillation system of the kind mentioned that requires a minimum of supervision. Another object of the invention is to provide a distillation system of this kind that operates continuously and is automatically controlled. A further object of the invention is to provide a distillation system of this kind that is compact and may be assembled as a unit and installed as a unit.

The foregoing objects and certain advantages that will hereinafter appear are realized in the embodiment of the invention illustrated in the accompanying drawing and described in detail below, from which description a clearer understanding of the invention may be had.

Figure 1:
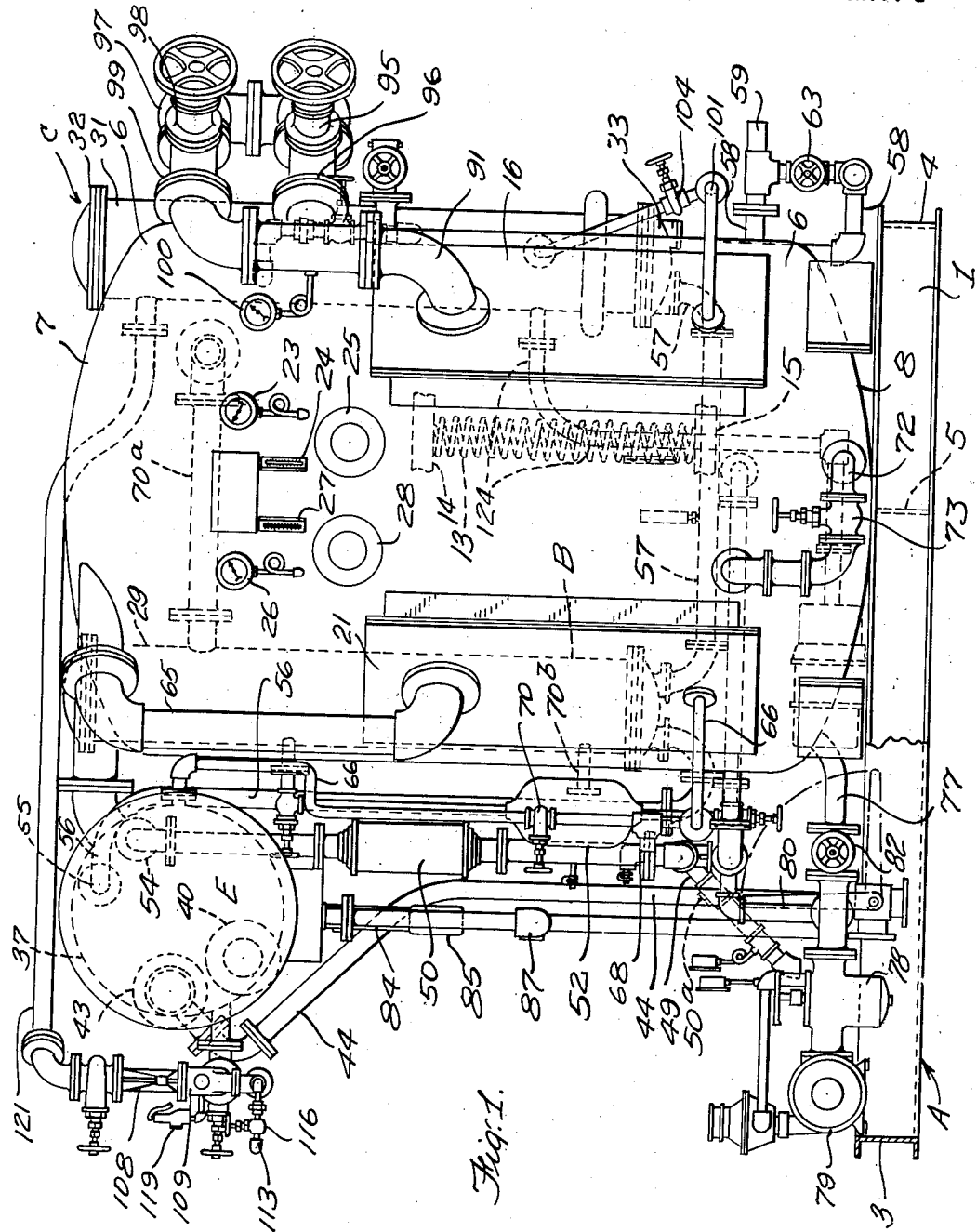
Figure 2:
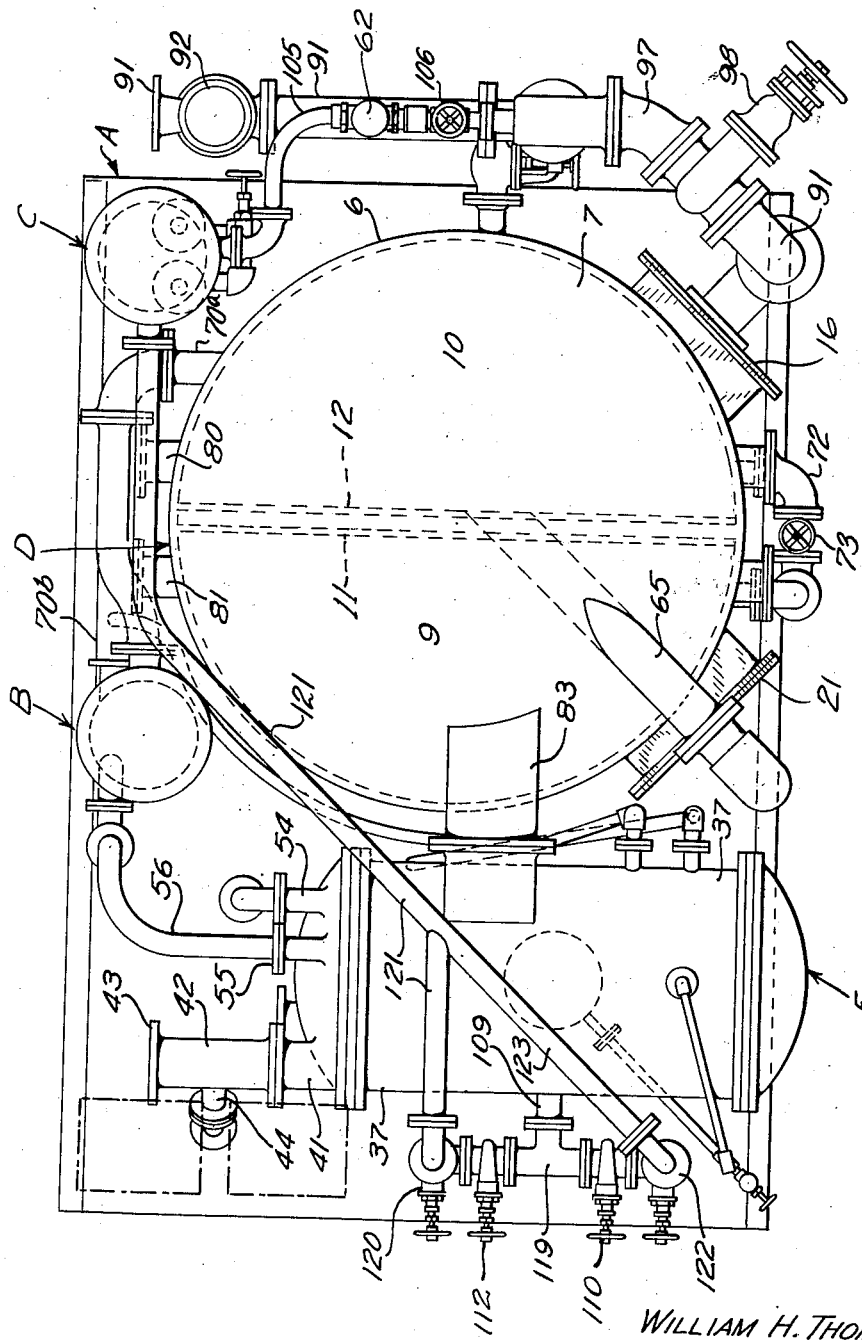
Figure 3:
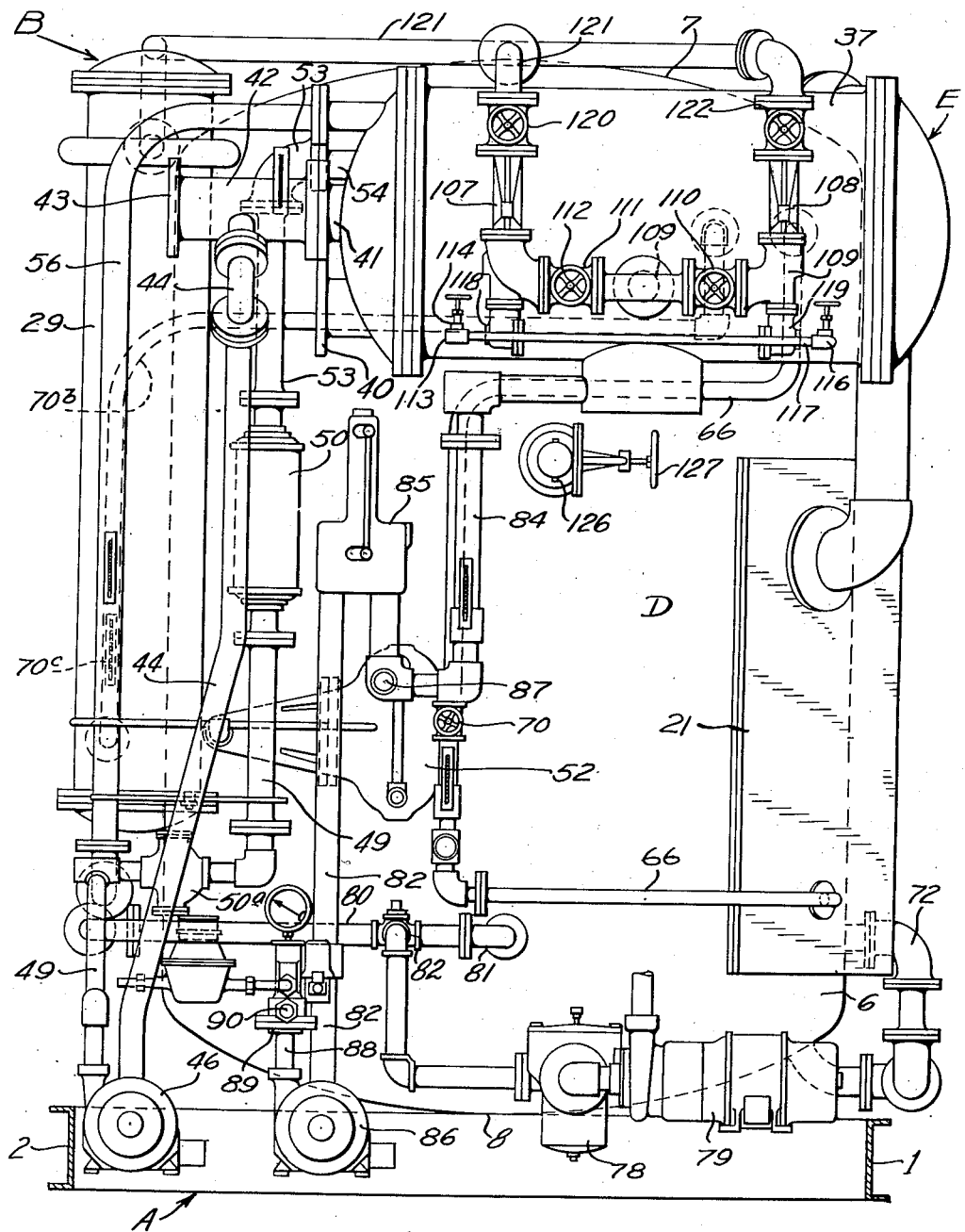
Figure 4:
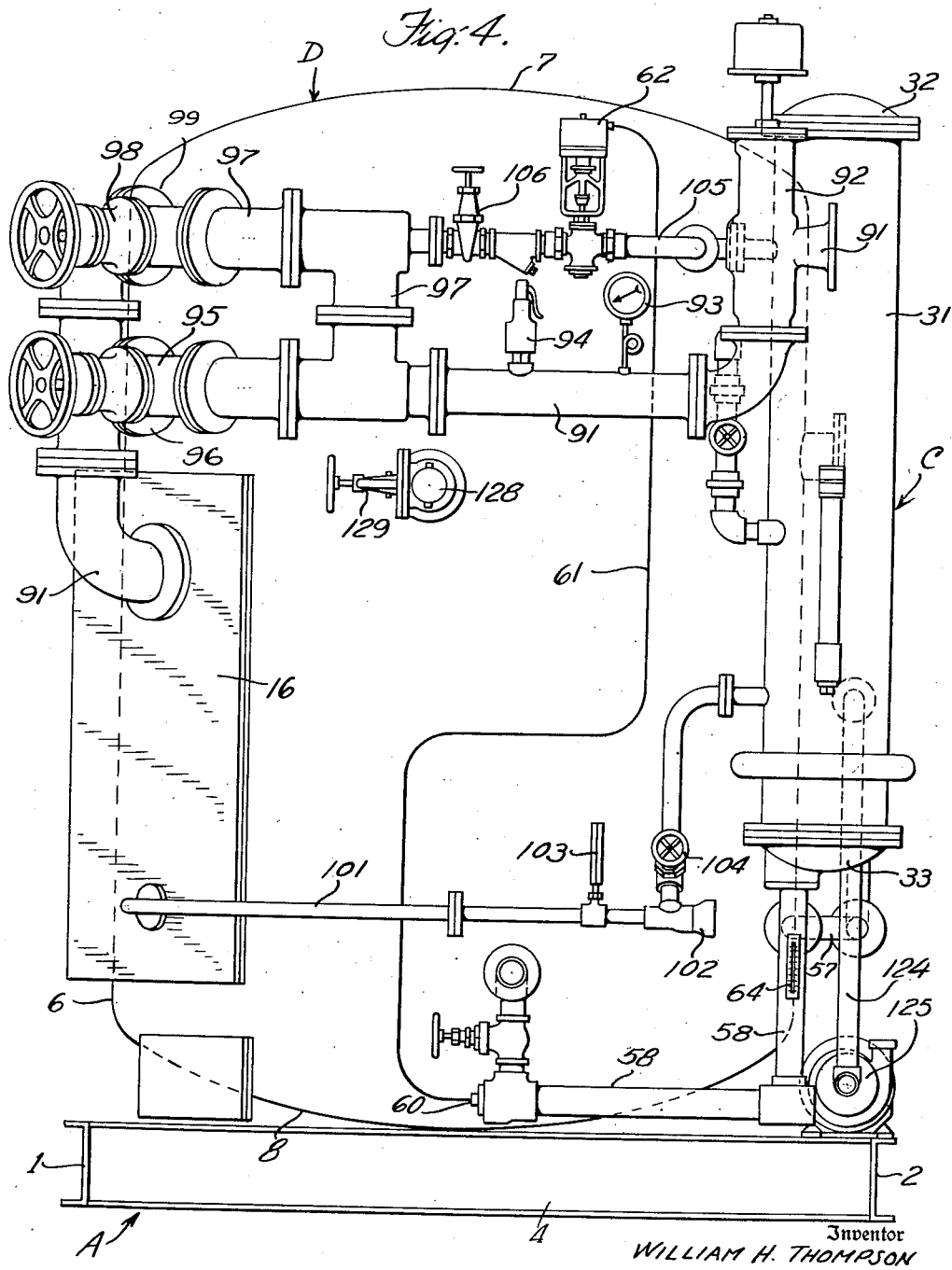
Figure 5:
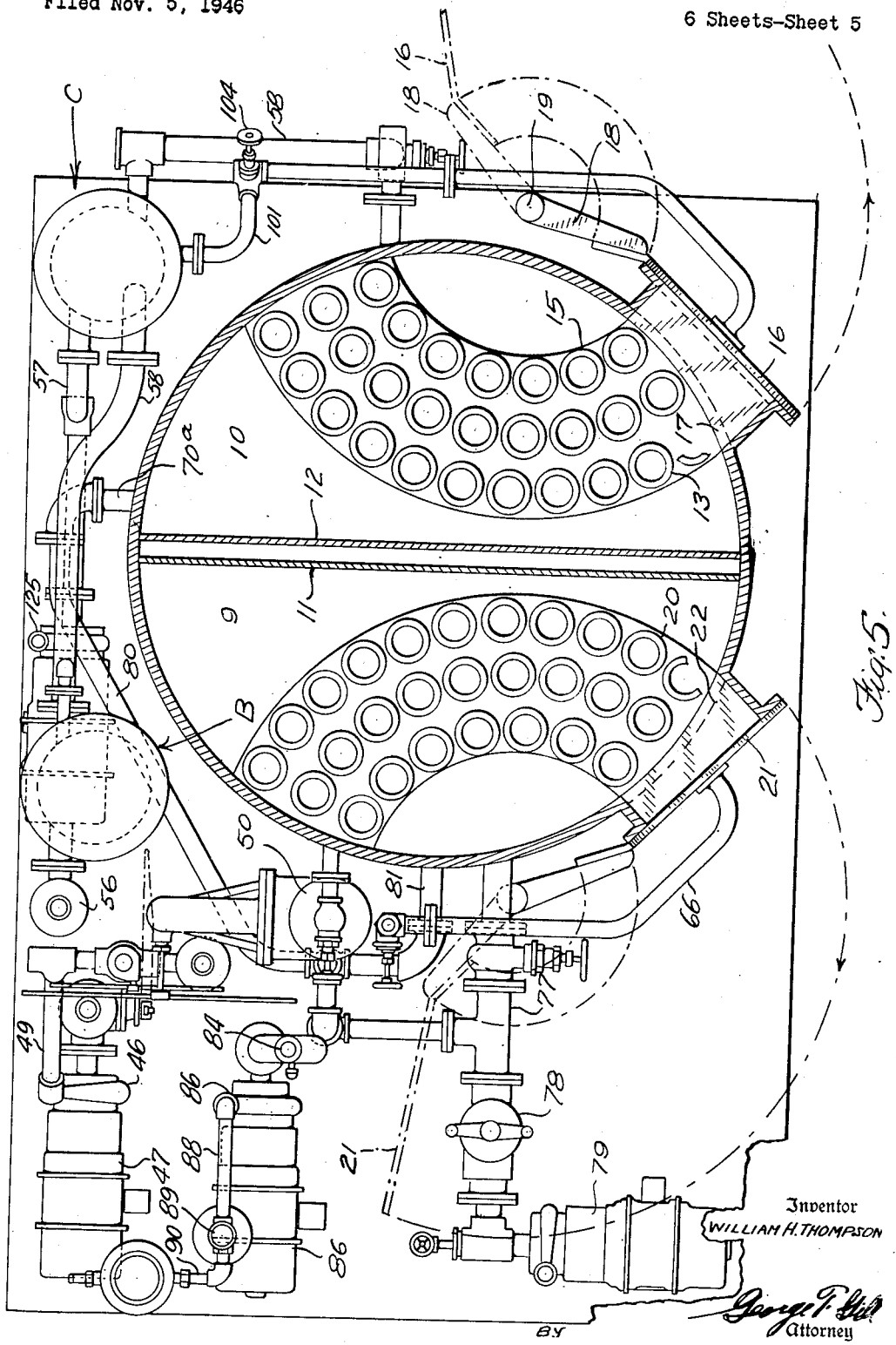
Figure 6:
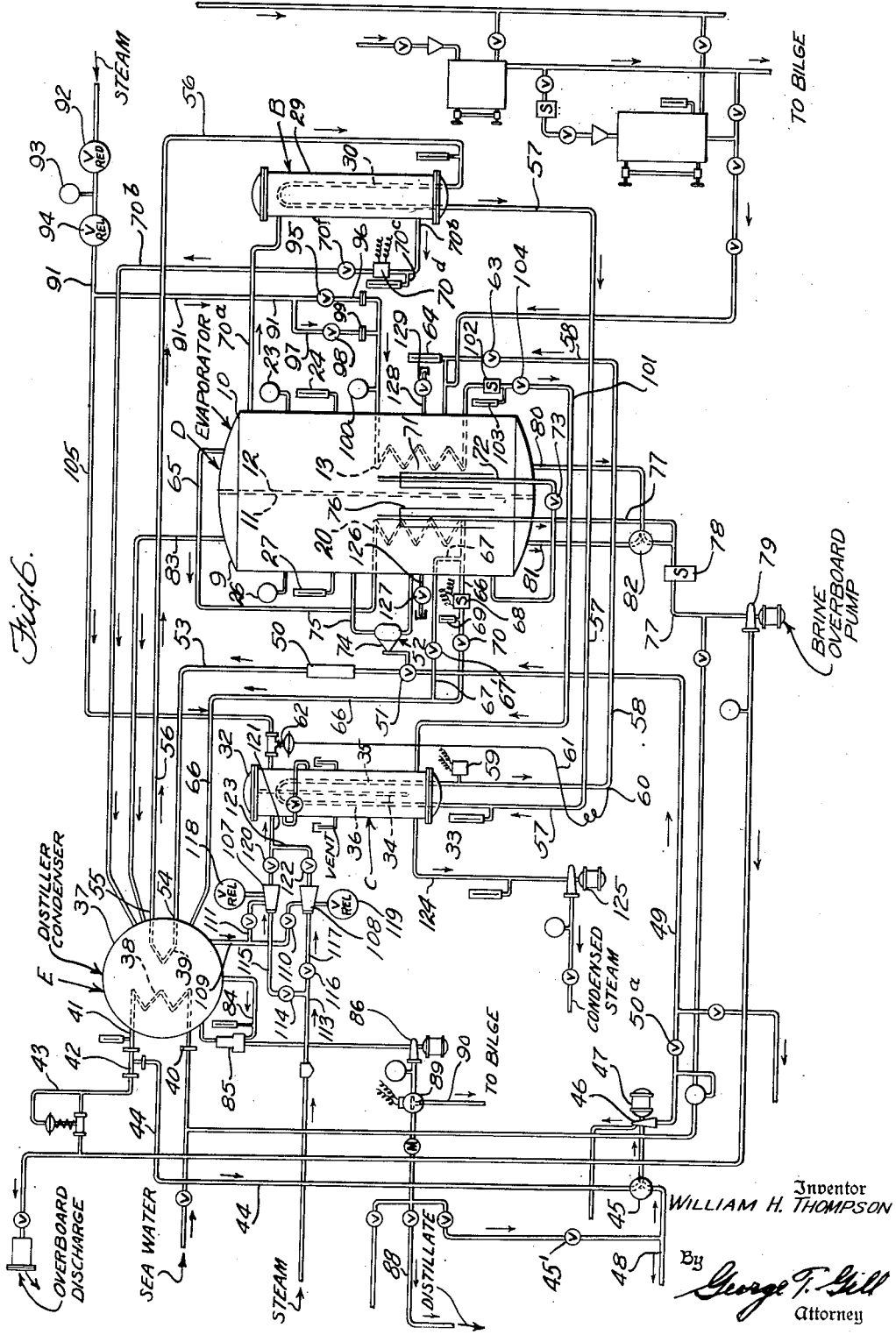

The drawings include:

Fig. 1 which is a front elevation of a distillation plant embodying the invention;

Fig. 2 which is a plan of the same;

Fig. 3 which is a left, side elevation of the same;

Fig. 4 which is a right, side elevation thereof;

Fig. 5 which is a transverse section of the same taken on the line 5—5 of Fig. 1; and Fig. 6 which is a piping diagram of the system.

As illustrated in Figs. 1–5 of the drawings, the distillation plant, selected for the purposes of illustrating a preferred embodiment of the invention, is arranged as a unit. It is adapted to be assembled as a unit at the factory and installed as a unit aboard ship. When installed, the steam and water connections are made to the appropriate lines and the unit is ready for operation.

To this end all of the apparatus making up the distillation plant is counted upon and supported by a base frame designated generally by the character A. Upon this base frame, there are the necessary supports for the various components of the distillation system. In general these component parts of the system include a vapor feed water heater B; a combined after-condenser and external feed water heater C; a double effect evaporator D; a condenser E; and the necessary piping, valves, controls and pumps for the interconnection of these component parts and the control and flow of steam and water.

The base frame A consists of a rectangular frame made up of four channel irons, welded together; a front channel iron 1, a rear channel iron 2, and side channel irons 3 and 4. Intermediate the side channel irons, extending between the front and rear channel irons and welded thereto, there are several I-beams such as the I-beam 5 (Fig. 1). Uprights and cross beams, appropriately located and extending from the frame may be used to support certain of the component parts of the plant. These have been omitted from the drawing in the interest of a clearer illustration of the distillation plant.

The double effect evaporator D is the largest component part of the plant and provides the vapor which is condensed by the condenser E to provide distillate that is suitable for human use and consumption. This double effect evaporator, which is comprehended within this invention, comprises two evaporators mounted within a single, cylindrical shell 6. The shell 6 is mounted vertically upon the base frame member A and is closed at its ends by convexed top and bottom members 7 and 8. Internally, the shell 6 is divided into two separate compartments 9 and 10 (Figs. 2, 5 and 6) by spaced, transverse plates 11 and 12, welded to the sides, bottom and top of the shell. Each compartment constitutes a separate and distinct evaporator.

Within the compartment 10, which constitutes the first effect evaporator, there are a plurality of vertically arranged, helical coils 13 (Figs. 1, 5 and 6), connected at their upper and lower ends, and supported by upper and lower manifolds 14 and 15. The manifolds extend from a door 16, which in the normal, operating position closes an opening 17 through the shell and opening to the chamber 10. The door 16 is supported by a pivotally mounted arm 18 (Fig. 5), pivoted at 19. The coils 13 are so arranged (Fig. 5) that the door 16 may be swung open (as shown in broken lines in Fig. 5), and the coils will move out of the chamber 10 to such an extent as to leave the opening 17 free. Thus, upon disconnecting the pipe connections, hereinafter described, the door 16 may be opened to expose the coils 13 and the interior of the compartment 10, for inspection and cleaning. In like manner, and for the same purpose, coils 20 are mounted between manifolds extending from a door 21 that closes an opening 22 to the compartment 9.

Each compartment is provided with a visual thermometer, pressure guage and observation opening. The compartment 10 (Fig. 1) has a pressure guage 23, a thermometer 24, and a glass-covered, observation opening 25. Similarly, the compartment 9 has a pressure guage 26, a thermometer 27 and a glass-closed, observation opening 28. The observation openings are provided, at the particular elevation indicated, to permit observation of the foaming and priming of the water being evaporated.

The vapor feed water heater B is mounted vertically, at the rear of the shell 6, and to the left (Fig. 2) sufficiently to come within the confines of the base frame. This feed water heater includes a cylindrical shell 29 and the usual end heads. Within the shell there are straight tubes rolled into tube sheets in a manner well known in the art and indicated diagrammatically at 30, in Fig. 6.

The combined after condenser and feed water heater C also consists of a cylindrical shell 31 mounted vertical, behind and adjacent the compartment 10 of the double effect evaporator D. The shell 31 is closed at each end by the usual removable heads 32 and 33 (Figs. 4 and 6). Within the shell (Fig. 6), there is a diametrical, longitudinal partition 34 extending from the upper head to a point adjacent the lower head 33. Two, or a multiple thereof, sets of tubes indicated diagrammatically at 35 and 36 in Fig. 6 are contained in the shell, equally divided on each side of the partition 34 and connected together in series.

The condenser E is mounted horizontally to the left of and adjacent the top of the double effect evaporator D. This condenser consists of a cylindrical shell 37 within which there are two separate (Fig. 6) passages or sets of tubes 38 and 39. The tubes, as is the case where tubes have been herein mentioned, have separate inlet and outlet connections and do not communicate with the shell, except that they are in heat-transfer relation to any fluid within the shell.

In addition to the above described component parts of the unitary distillation plant of this invention, there is comprehended within the system of the invention, the piping of these parts, one to the other, to obtain a particular flow of fluids, and the pumps and control mechanism for affecting the desired results. Generally speaking, the water to be distilled flows through the tubes of the condenser E to condense the vapors in the shell; the tubes of the vapor feed water heater B; the tubes of the combined after condenser and feed water heater C; the shell of the first effect evaporator, and the shell of the second effect evaporator, both of which constitute the double effect evaporator D; and from the second effect evaporator the concentrated water is pumped overboard. Steam from the exhaust steam supply of the ship is delivered to the tubes of the first effect evaporator and also to the combined after condenser and external feed water heater C. The vapors from the first effect evaporator are divided. Part flows through the shell of the vapor feed water heater B and the major part through the tubes of the second effect evaporator. From the vapor feed water heater B and the tubes of the second effect evaporator, these vapors and condensate pass to the shell of the condenser E. In addition, vapors formed in the second effect evaporator (chamber 9) pass to the condenser. The distillate from the condenser is free of all impurities.

The piping, pump and control arrangement is hereinafter described first in relation to the flow of the water to be distilled, second in relation to the distillation, third in relation to the heating fluid, and fourth in relation to the various controls. Sea water, from the salt water circulating system of the ship is connected to the inlet 40 of the tubes 38 of the condenser E. More sea water is required to condense and cool the vapors delivered to the condenser than is required by the distillation plant. For this reason, the outlet 41 of the coil 38 is connected to a T-fitting 42. Through this T-fitting the outlet 41 of the tubes 38 is connected in common to an overboard discharge 43 and a pipe 44 which constitutes a passage for the evaporator feed water. The feed water pipe 44 is connected through a three way, two port plug valve 45 (Fig. 6) to the inlet end of an evaporator, feed pump 46, driven by an electric motor 47. One side of the valve 45 is connected through a connection 48, to the inner bottom reserve feed tanks of the ship to which, through the valve 45, the feed pump may be connected under adverse conditions. Thus, there are two sources for feeding the evaporators, water directly from the sea and the inner bottom reserve tanks of the ship.

From the pressure or exhaust end of the pump 46, a pipe 49 is connected to a rate of flow meter 50. Intermediate the pump and the rate of flow meter, there are a swing check valve 50a to prevent reverse flow, and a high level valve 51 controlled by a float control 52, hereinafter described. From the meter 50 which provides a continuous, visual indication of the rate of flow of water to the evaporators, the sea water passes, through pipe 53 to the inlet connection 54 of the tubes 39 of the condenser E. From the outlet connection 55 of the tubes 39, the sea water passes through a pipe 56 to the inlet end of the tubes 30 within the shell 29 of the vapor feed water heater B. From the outlet of the tubes 30, the water is delivered through a pipe 57 to the inlet of the tubes 36 of the combined after condenser and external feed water heater C.

The combined after condenser and external feed water heater C operates as a condenser, as will be hereinafter described, and an additional feed water heater. In the latter capacity, it is provided to insure that the water to be distilled will be heated above one hundred and sixty-five degrees Fahrenheit. This has been a requirement of the health service and is intended as assurance that all bacteria will be destroyed.

The water passes through the tubes 36 and the tubes 35 and through a pipe line 58 to the chamber 10 of the double effect evaporator D. In the line 58, there is connected an aqua switch 59, adjacent the outlet from the tubes 35; a temperature bulb connection 60, which through a line 61 actuates a valve 62, in the steam line (hereinafter described); the globe valve 63, adjacent the inlet to the chamber 10; and a thermometer 64. Within the chamber 10, the water is evaporated and vapors flow through a pipe 65 to the inlet to the tubes 20 within the compartment 9. From the tubes 20 the vapor and condensate flow through a pipe 66 to the shell of the condenser E. An air vent line 67, connects the outlet end of the tubes 20 and the pipe 66; a valve 67' being interposed therein. In the line 66, adjacent the outlet from the tubes 20, there are a salinity cell 68, a thermometer 69 and a globe valve 70.

Part of the vapor formed in the chamber 10 passes through a pipe 70a to the shell of the vapor feed water heater B wherein it is used to heat the water passing through the tubes 30. The drains from the shell of the vapor feed water heater are delivered through a pipe 70b to the shell of the condenser E. Connected in the pipe 70b, adjacent the connection to the feed water heater, there are a thermometer 70c, a salinity cell 70d and a globe valve 70f.

Part of the water delivered to the chamber 10 flows through an open over-flow arrangement 71, such as described in the Patent No. 2,388,773, and through a pipe 72, in which a gate valve 73 is interposed, to the chamber 9. The high level float control 52, connected in an equalizer line 75, communicating with the chamber 9, actuates the valve 51 to control the flow of water of the evaporators. The high level control is so positioned as to provide sufficient water in the chamber 9 which insures an adequate level in the chamber 10 and a continuous discharge through an open overflow 76 in the chamber 9. The overflow 76 is constructed as described in the aforesaid U. S. Patent No. 2,388,773. Excess water passing through the overflow 76, passes through a pipe 77, in which there is a strainer 78, to a pump 79 by which it is pumped overboard. There is thus a continuous blow down of the chambers 10 and 9.

A drain connection 80 is connected to the bottom of the chamber 10, and a like drain connection 81 extends from the bottom of the chamber 9. These are connected through a three-way, two port cock 82 to the pipe 77 such that the drainage passes through the strainer 78.

Vapor formed in the chamber 9 passes through a pipe 83 to the shell of the condenser E. Thus, the vapors formed in the chambers 9 and 10 are delivered to the shell of the condenser where they are distilled. The distillate passes from the shell of the condenser through a pipe 84, having a flow indicator 85 of the kind known as a "Flowdicator" therein, to a distillate pump 86. Just before the pump 86, there is interposed in the pipe 84, a salinity cell 87. The pump delivers the distillate through a pipe 88 to a distilled water reserve feed tank (not shown). In the pipe 88, there is a three-way solenoid actuated valve 89 by means of which the distilled water may be by-passed through a pipe 90 to the bilge.

The heating fluid is taken from the exhaust steam supply of the ship. This steam, normally at a gauge pressure of ten pounds per square inch, is delivered to an inlet line 91 through a weight-loaded reducing valve 92 (Figs. 2, 4 and 6) which may be set at five pounds per square inch gauge pressure. A pressure gauge 93 is desirably connected in the line between the valve 92 and a relief valve 94. The pipe connects the steam supply to the inlet to the tubes 13 of the chamber 10. In the line 91, there is a gate valve 95 and a diaphragm 96 having an orifice therein of a size to allow just sufficient steam therethrough for normal operation. A by-pass line 97 connected into the line 91, at one end before the valve 95 and at the other end after the diaphragm 96, has a gate valve 98 therein and a diaphragm 99 having an opening or orifice therethrough for clean operation. Depending upon the operation desired one of the valves 95 or 98 is open and the other is closed. A compound gauge 100, registering pressure and vacuum, is connected in the line 91 adjacent the connection to the tubes 13.

From the outlet end of the tubes 13, a pipe 101 is connected to the shell of the combined after condenser and external feed water heater C. Connected in the pipe line 101, adjacent the outlet from the tubes 13, there are a salinity cell 102, a thermometer 103 and a globe valve 104. A branch pipe line 105, connected to the pipe 91 delivers steam directly to the shell of the combined after condenser and feed water heater C. In this line there is a gate valve 106 and the temperature regulating valve 62. Steam is admitted to the shell of the after condenser C in accordance with the temperature of the feed water leaving the after condenser through the pipe 58.

In addition to condensing the steam leaving the tubes 13, the after condenser and feed water heater receives the air and vapor discharge from air ejectors 107 and 108 (Figs. 3 and 6). These air ejectors are provided for removing air from the shell of the condenser. To this end, a pipe 109 is connected to the ejector 108, through a gate valve 110, and through a branch pipe 111 to the ejector 107. A valve 112 is provided in the pipe 111. Steam at high pressure is supplied at a fitting 113 which is connected through a valve 114 and a pipe 115 to the ejector 107, and through a valve 116 and a pipe 117 to the ejector 108 (Figs. 1, 3 and 6). Each ejector 107 and 108 is provided with a relief valve 118 and 119, respectively. The exhaust end of the ejector 107 is connected through a valve 120 to a pipe 121 connected to the shell of the after condenser C, and the exhaust from the ejector 108 is connected through a valve 122 and a pipe 123 to the pipe 121. A pipe 124 connected to the shell of the after condenser and feed water heater C delivers the condensate to a pump 125 by which it is pumped to a heater or other apparatus forming no part of this distillation system.

Through the walls of each of the chambers 9 and 10 there is a connection for shock descaling of the tubes therein. The connection to the chamber 9 consists of a short pipe 126 having a valve 127 therein. This pipe is connected to the fire system so that cold water may be directed on the tubes therein. A like pipe 128 having a valve 129 therein is connected through the shell of the chamber 10. By disconnecting the pipe connections to the tubes 13, the door 16 may be opened as above described, and by disconnecting the connections to the tubes 20, the door 21 may be opened.

The salinity cell 87 is electrically connected to control the operations of the three-way, solenoid actuated valve 89. When the salinity of the distillate reaches or exceeds a predetermined value, the valve 89 is actuated to discharge the distillate to the bilge. When, however, the salinity of the distillate is below the predetermined value, the valve 89 is in position to deliver the distillate to the drinking water and reserve distilled water tanks. The remaining salinity cells are connected to a salinity indicator (not shown but well known in the art). In the event that the salinity of the distillate is such that it is spilled to bilge, the location of the trouble or faulty operation may be traced by the indications from the several salinity cells.

From the foregoing description of the distillation plant, forming one specific embodiment of the invention, it will be apparent to those skilled in the art that by this invention, there is provided a distillation system that is unitary in construction; that is adaptable to a compact distillation plant; that is reliable in operation, and that requires a minimum of attention and maintenance.

It will be obvious that various changes may be made by those skilled in the art in the details of the embodiment of the invention illustrated in the drawing and described above within the principle and scope of the invention as expressed in the appended claims.

I claim:

1. In apparatus for evaporating and distilling liquids, a unitary structure comprising a base frame and supporting elements, a double effect evaporator mounted on the frame and consisting of a vertically mounted shell, a diametrical wall within the shell dividing the shell into a first effect evaporating chamber and a second effect evaporating chamber, a set of tubes extending into each semi-cylindrical evaporating chamber, a vapor feed water heater mounted vertically adjacent the double effect evaporator, a combined after-condenser and feed water heater mounted vertically adjacent the double effect evaporator, a condenser mounted horizontally adjacent the double effect evaporator, connections for delivering steam to the coil in said first effect evaporating chamber, connections for delivering steam to said combined after-condenser and feed water heater, means in said last mentioned connection for controlling the flow of steam to said combined after-condenser and feed water heater, control means for said last mentioned means actuated in accordance with the temperature of the water leaving said combined after condenser and feed water heater, connections between the first effect chamber of said double effect evaporator and the tubes extending into the second effect chamber of said double effect evaporator, a connection between the first effect chamber of said double effect evaporator the said vapor feed water heater, and connections connecting the coil in the second effect chamber of the said double effect evaporator, the second effect chamber of the said double effect evaporator and the said vapor feed water heater to the condenser, and connections for delivering water in succession to said condenser, said vapor feed water heater, said combined after condenser and feed water heater and the first effect chamber of said double effect evaporator.

2. In apparatus for evaporating and distilling liquids, a unitary structure comprising a base frame and supporting elements, a double effect evaporator mounted on the frame and consisting of a vertically mounted cylindrical shell, a diametrical wall within the shell dividing the shell into a first effect evaporating chamber and a second effect evaporating chamber, a set of tubes extending into each semi-cylindrical chamber, a steam connection to the tubes extending into the first effect evaporating chamber, a combined after-condenser and feed water heater including a shell and a coil therein, the combined after-condenser and feed water heater being mounted vertically adjacent said double effect evaporator, a connection between the outlet of the tubes in the first effect chamber of the said double effect evaporator and the shell of the said combined after-condenser and feed water heater, a vapor feed water heater mounted vertically adjacent the said double effect evaporator, a condenser mounted horizontally adjacent the said double effect evaporator, a connection for delivering steam directly to the shell of said combined after-condenser and feed water heater, means in said last mentioned connection for controlling the flow of steam to the shell of said combined after-condenser and water heater, control means for said last mentioned means actuated in accordance with the temperature of the water leaving the coil of the said after-condenser and feed water heater, a connection between the first effect chamber of said double effect evaporator and the inlet to the tubes extending into the second effect chamber of the said double effect evaporator, a connection between the first effect chamber of said double effect evaporator and the aforesaid vapor feed water heater, connections connecting the outlet of the coil in the second effect chamber of the said double effect evaporator, the second effect chamber of the said double effect evaporator, and the said vapor feed water heater to the condenser, and connections for delivering water in succession to said condenser, said vapor feed water heater, said combined after condenser and feed water heater and the first effect chamber of said double effect evaporator.

3. In apparatus for evaporating and distilling liquids, a unitary structure comprising a base frame and supporting elements, a double effect evaporator mounted on the frame and consisting of a vertically mounted cylindrical shell, a diametrical wall within the shell dividing the shell into a first effect evaporating chamber and a second effect evaporating chamber, a hingedly mounted door on each side of the diametrical wall, one for each chamber and each door carrying a set of tubes which in the closed positions of the doors extend into the chambers, a steam connection to the tubes extending into the first effect evaporating chamber, a combined after-condenser and feed water heater including a shell and a coil therein, the combined after-condenser and feed water heater being mounted vertically adjacent said double effect evaporator, a connection between the outlet of the tubes in the first effect chamber of the said double effect evaporator and the shell of the said combined after-condenser and feed water heater, a vapor feed water heater mounted vertically adjacent the said double effect evaporator, a condenser mounted horizontally adjacent the said double effect evaporator, a connection for delivering steam directly to the shell of said combined after-condenser and feed water heater, means in said last mentioned connection for controlling the flow of steam to the shell of said combined after-condenser and water heater, control means for said last mentioned means actuated in accordance with the temperature of the water leaving the coil of the said after-condenser and feed water heater, a connection between the first effect chamber of said double effect evaporator and the inlet to the tubes extending into the second effect chamber of the said double effect evaporator, a connection between the first effect chamber of said double effect evaporator and the aforesaid vapor feed water heater, connections connecting the outlet of the coil in the second effect chamber of the said double effect evaporator, the second effect chamber of the said double effect evaporator, and the said vapor feed water heater to the condenser, and connections for delivering water in succession to said condenser, said vapor feed water heater, said combined after-condenser and feed water heater and the first effect chamber of said double effect evaporator.

4. In apparatus for evaporating and distilling liquids, a unitary structure comprising a base frame and supporting elements, a double effect evaporator mounted on the frame and consisting of a vertically mounted cylindrical shell, a diametrical wall within the shell dividing the shell into a first effect evaporating chamber and a second effect evaporating chamber and a hingedly mounted door on each side of the diametrical wall, one for each evaporating chamber and each door carrying a set of tubes which in the closed position of the doors extend into the respective chambers, a steam connection extending to the inlet to the tubes extending into the first effect evaporating chamber of the double effect evaporator, a combined after-condenser and feed water heater mounted vertically adjacent the double effect evaporator and consisting of a cylindrical shell having a coil therein, a connection between the outlet of the tubes extending into the first effect chamber of the double effect evaporator and the shell of the said combined after-condenser and feed water heater, an outlet connection from the shell of the said combined after-condenser and feed water heater, a connection for delivering steam directly to the shell of the said after-condenser and feed water heater, means in said last mentioned connection for controlling the flow of steam to the shell of the said combined after-condenser and feed water heater, control means for said last mentioned means actuated in accordance with the temperature of the water leaving the coil of the said after-condenser and feed water heater, a condenser including a cylindrical shell mounted adjacent said double effect evaporator and having two separate coils therein, a connection for delivering water to be distilled to the inlet of one of the coils in said condenser, a connection from the outlet of said last mentioned coil to the inlet of the other coil in the condenser, a vapor feed water heater including a cylindrical shell mounted vertically adjacent the said double effect evaporator and a coil within the shell, a connection between the outlet of said second mentioned coil of the said condenser and the inlet to the coil of said vapor feed water heater, a connection between the outlet of the coil of said vapor feed water heater and the inlet of the coil of the said after-condenser and feed water heater, a connection between the outlet of the coil of the said after-condenser and feed water heater and the first effect chamber of the said double effect evaporator, a connection between the first effect chamber of said double effect evaporator and the inlet to the tubes extending into said second effect chamber of the double effect evaporator, a connection between the first effect chamber of said double effect evaporator and the shell of the said vapor feed water heater, and connections connecting the outlet of the coil extending into the second effect chamber of the double effect evaporator, the second effect chamber of the double effect evaporator and the shell of the said vapor feed water heater to the shell of the condenser.

5. In apparatus for evaporating and distilling liquids, a unitary structure comprising a base frame and supporting elements, a double effect evaporator mounted on the frame and consisting of a vertically mounted cylindrical shell, a diametrical wall within the shell dividing the shell into a first effect evaporating chamber and a second effect evaporating chamber and a hingedly mounted door on each side of the diametrical wall, one for each evaporating chamber and each door carrying a set of tubes which in the closed position of the doors extend into the respective chambers, a steam connection extending to the inlet to the tubes extending into the first effect evaporating chamber of the double effect evaporator, a combined after-condenser and feed water heater mounted vertically adjacent the double effect evaporator and consisting of a cylindrical shell having a coil therein, a connection between the outlet of the tubes extending into the first effect chamber of the double effect evaporator and the shell of the said combined after-condenser and feed water heater, an outlet connection from the shell of the said combined after-condenser and feed water heater, a connection for delivering steam directly to the shell of the said after-condenser and feed water heater, means in said last mentioned connection for controlling the flow of steam to the shell of the said combined after-condenser and feed water heater, control means for said last mentioned means actuated in accordance with the temperature of the water leaving the coil of the said after-condenser and feed water heater, a condenser including a cylindrical shell mounted adjacent said double effect evaporator and having two separate coils therein, a connection for delivering water to be distilled to the inlet of one of the coils in said condenser, a connection from the outlet of said last mentioned coil to the inlet of the other coil in the condenser, a vapor feed water heater including a cylindrical shell mounted vertically adjacent the said double effect evaporator and a coil within the shell, a connection between the outlet of said second mentioned coil of the said condenser and the inlet to the coil of said vapor feed water heater, a connection between the outlet of the coil of said vapor feed water heater and the inlet of the coil of the said after-condenser and feed water heater, a connection between the outlet of the coil of the said after-condenser and feed water heater and the first effect chamber of the said double effect evaporator, a connection between the first effect chamber of said double effect evaporator and the inlet to the tubes extending into said second effect chamber of the double effect evaporator, a connection between the first effect chamber of said double effect evaporator and the shell of the said vapor feed water heater, connections connecting the outlet of the coil extending into the second effect chamber of the double effect evaporator, the second effect chamber of the double effect evaporator and the shell of said vapor feed water heater to the shell of the condenser, open blow-down connections to the chambers of the evaporators, and level controls for controlling the level of the water in the chambers of the double effect evaporators.

WILLIAM H. THOMPSON.

REFERENCES CITED

The following references are of record in the file of this patent:

UNITED STATES PATENTS

| Number | Name | Date |
|---|---|---|
| Re. 21,129 | Fox et al. | June 27, 1939 |
| 982,505 | Koenig | Jan. 24, 1911 |
| 1,045,023 | Heisserman | Nov. 19, 1912 |
| 2,165,044 | Fox | July 4, 1939 |
| 2,314,152 | Mallory | Mar. 16, 1943 |
| 2,374,519 | Worthen | Apr. 24, 1945 |
| 2,378,350 | Worthen et al. | June 12, 1945 |
| 2,388,599 | Cleaver | Nov. 6, 1945 |
| 2,388,773 | Thompson | Nov. 13, 1945 |
| 2,398,068 | Worthen | Apr. 9, 1946 |